(12) United States Patent
Takai et al.

(10) Patent No.: US 8,402,485 B2
(45) Date of Patent: Mar. 19, 2013

(54) ADVERTISEMENT INSERTING VOD DELIVERY METHOD AND VOD SERVER

(75) Inventors: Hidenori Takai, Kawasaki (JP); Masayuki Uchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 701 days.

(21) Appl. No.: 12/588,698

(22) Filed: Oct. 23, 2009

(65) Prior Publication Data
US 2010/0153988 A1 Jun. 17, 2010

(30) Foreign Application Priority Data

Oct. 23, 2008 (JP) .................. 2008-272598

(51) Int. Cl.
*H04N 7/173* (2011.01)
*H04N 7/16* (2011.01)

(52) U.S. Cl. ............... 725/32; 725/54; 725/87; 725/93; 725/98

(58) Field of Classification Search .................. 725/32, 725/54, 87, 93, 98
See application file for complete search history.

(56) References Cited

U.S. PATENT DOCUMENTS 5,732,217 A * 3/1998 Emura ........................... 725/90
6,754,271 B1 * 6/2004 Gordon et al. ........... 375/240.12
2005/0193425 A1 * 9/2005 Sull et al. ....................... 725/135
2005/0259946 A1 11/2005 Kitamura
2006/0287956 A1 12/2006 Higashi et al.

FOREIGN PATENT DOCUMENTS

| JP | 11-261958 | 9/1999 |
|---|---|---|
| JP | 2005-160032 | 6/2005 |
| JP | 2007-96723 | 4/2007 |

OTHER PUBLICATIONS

Japanese Office Action issued Oct. 23, 2012 in corresponding Japanese Patent Application No. 2008-272598.

* cited by examiner

*Primary Examiner* — Kieu Oanh T Bui
(74) *Attorney, Agent, or Firm* — Staas & Halsey LLP

(57) ABSTRACT

A VOD server refers to advertisement delivery information, and inserts a stream of advertising content in a stream of video content of a main part, based on advertisement inserting position information indicating an inserting position of the advertising content to be inserted into the video content of the main part, for delivery to a client terminal. When making this delivery, at least time information, such as time management information of reproduced output or decoding, to be added to the stream of the video content of the main part and the stream of the advertising content to be delivered to the client terminal, is replaced by time information in accordance with an order of the streams to be delivered to the client terminal.

6 Claims, 9 Drawing Sheets

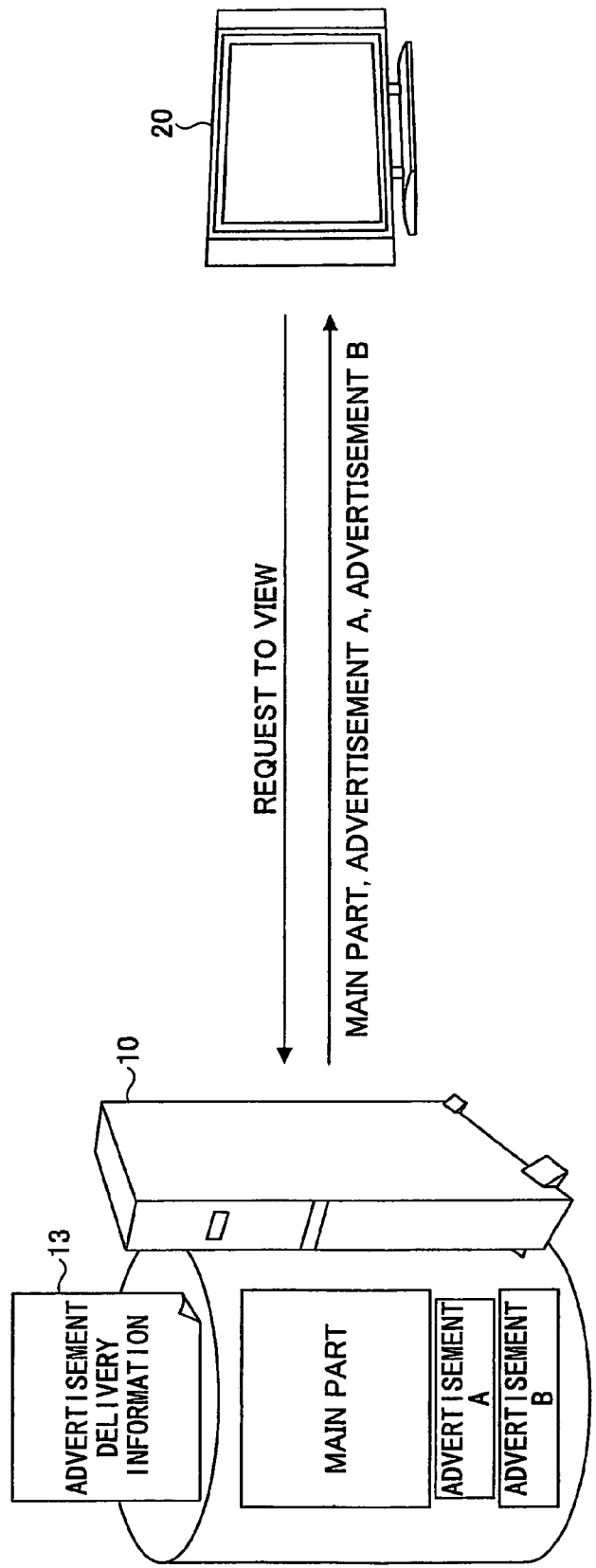

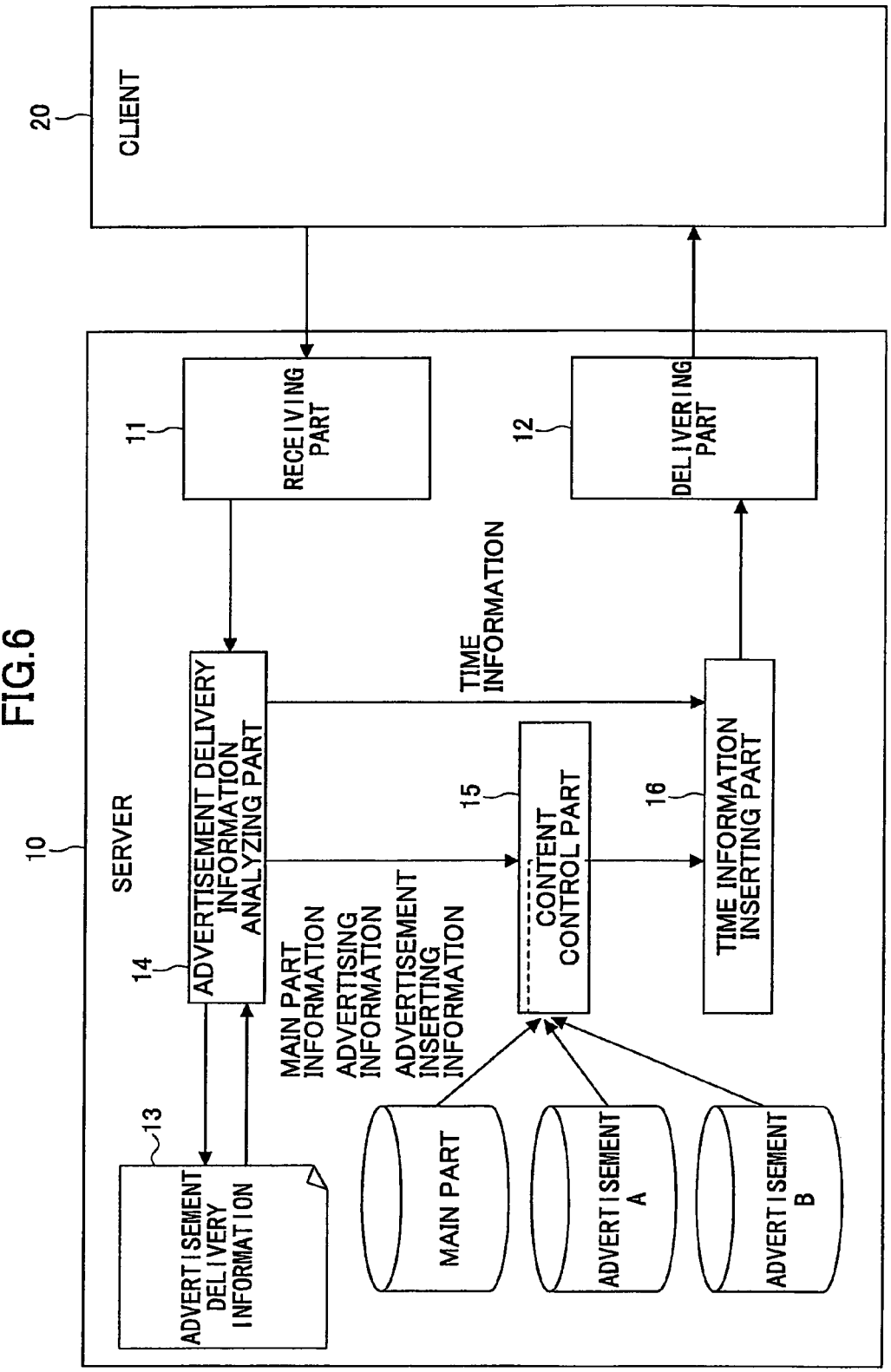

FIG.7

| No. | INFORMATION | | | | NUMBER OF TIMES |
|---|---|---|---|---|---|
| 1 | ADVERTISEMENT DELIVERY INFORMATION | | | | 1 |
| 2 | | MAIN PART INFORMATION | | | 1 |
| 3 | | | FILE NAME | | 1 |
| 4 | | | PCR | | AMOUNTING TO 1 |
| 5 | | | | POSITION | 1 |
| 6 | | | | VALUE | 1 |
| 7 | | | PTS | | AMOUNTING TO 1 |
| 8 | | | | POSITION | 1 |
| 9 | | | | VALUE | 1 |
| 10 | | | DTS | | AMOUNTING TO 1 |
| 11 | | | | POSITION | 1 |
| 12 | | | | VALUE | 1 |
| 13 | | | I PICTURE START POSITION | | AMOUNTING TO 1 PICTURE |
| 14 | | ADVERTISING INFORMATION | | | AMOUNTING TO 1 ADVERTISEMENT |
| 15 | | | FILE NAME | | 1 |
| 16 | | | PCR | | AMOUNTING TO 1 |
| 17 | | | | POSITION | 1 |
| 18 | | | | VALUE | 1 |
| 19 | | | PTS | | AMOUNTING TO 1 |
| 20 | | | | POSITION | 1 |
| 21 | | | | VALUE | 1 |
| 22 | | | DTS | | AMOUNTING TO 1 |
| 23 | | | | POSITION | 1 |
| 24 | | | | VALUE | 1 |
| 25 | | | I PICTURE START POSITION | | AMOUNTING TO 1 PICTURE |
| 26 | | ADVERTISEMENT INSERTING POSITION | | | AMOUNTING TO 1 ADVERTISEMENT |
| 27 | | | TIME | | 1 |
| 28 | | | SKIP OR PROHIBIT SKIP | | 1 |
| 29 | | | TIME INFORMATION (INFORMATION AFTER INSERTING ADVERTISEMENT) | | 1 |
| 30 | | | PCR | | AMOUNTING TO 1 |
| 31 | | | | POSITION | 1 |
| 32 | | | | VALUE | 1 |
| 33 | | | PTS | | AMOUNTING TO 1 |
| 34 | | | | POSITION | 1 |
| 35 | | | | VALUE | 1 |
| 36 | | | DTS | | AMOUNTING TO 1 |
| 37 | | | | POSITION | 1 |
| 38 | | | | VALUE | 1 |

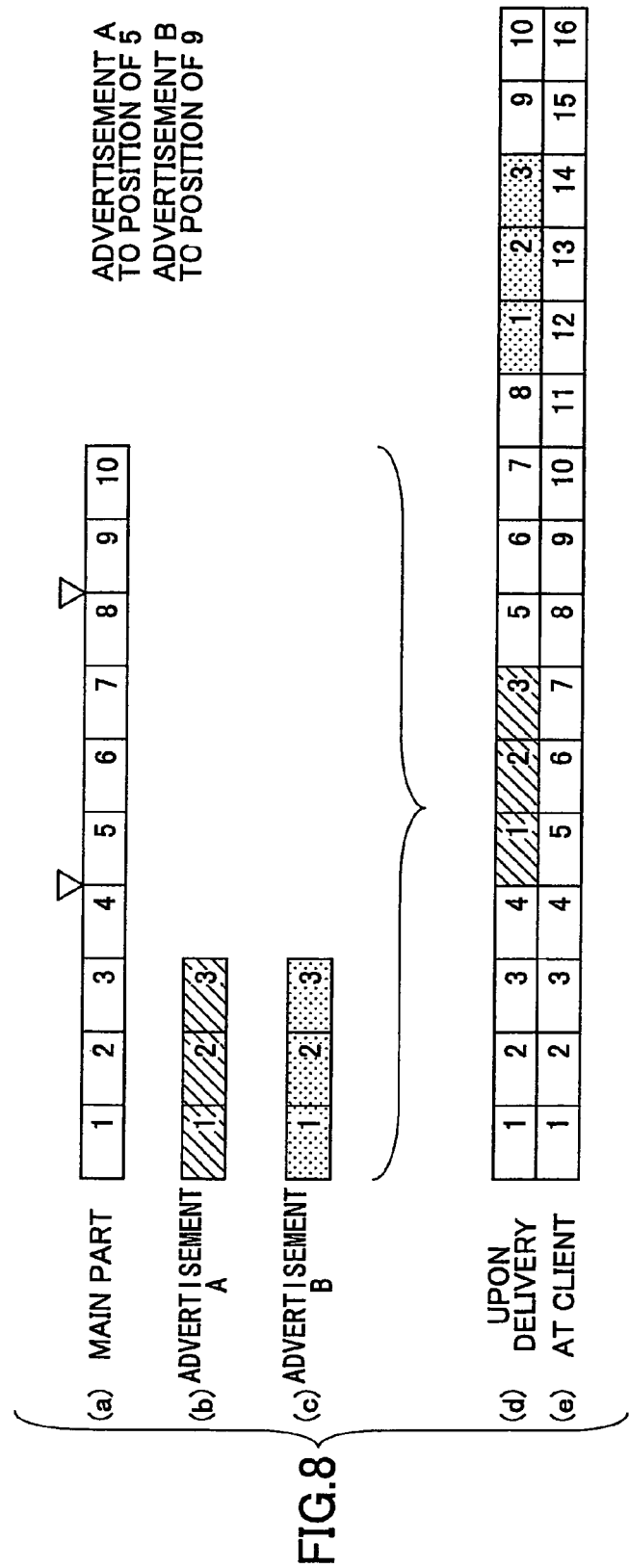

FIG.9

- ADVERTISEMENT DELIVERY INFORMATION
TIME INFORMATION

| PCR | | PTS | | DTS | |
|---|---|---|---|---|---|
| POSITION 1 | | POSITION 1 | | POSITION 1 | |
| VALUE | 1 | VALUE | 1 | VALUE | 1 |
| POSITION 2 | | POSITION 2 | | POSITION 2 | |
| VALUE | 2 | VALUE | 2 | VALUE | 2 |
| POSITION 3 | | POSITION 3 | | POSITION 3 | |
| VALUE | 3 | VALUE | 3 | VALUE | 3 |
| POSITION 4 | | POSITION 4 | | POSITION 4 | |
| VALUE | 4 | VALUE | 4 | VALUE | 4 |
| ... | | ... | | ... | |

UPON
DELIVERY
AT CLIENT

| 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 |

※ DISPLAYED AS 1 KIND OF TIME INFORMATION BECAUSE
TIME INFORMATION OF PCR, PTS & DTS ARE THE SAME understand# ADVERTISEMENT INSERTING VOD DELIVERY METHOD AND VOD SERVER

CROSS-REFERENCE TO RELATED APPLICATIONS

This application is based upon and claims the benefit of priority of the prior Japanese Patent Application No. 2008-272598 filed on Oct. 23, 2008, the entire contents of which are incorporated herein by reference.

FIELD

The present invention relates to advertisement inserting VOD delivery methods and VOD servers. The VOD (Video On Demand) service enables audiences to view and listen to various video contents. The advertisement inserting VOD delivery method and the VOD server of the present invention deliver streams (or data sequences) in which advertising contents are inserted into the video contents.

BACKGROUND

Recently, the VOD delivery streaming specifications have been standardized, and client terminals in conformance with the standard, such as Internet televisions and Set Top Boxes (STBs), have been reduced to practice. Hence, the VOD delivery is made as a part of a large-scale IPTV (Internet Protocol TeleVision).

Te VOD delivery streaming specifications that have been standardized include the following with respect to encoding of moving pictures or dynamic images and audio information related thereto.

"ISO/IEC 13818 Generic coding of moving pictures and associated audio information"

Recently, the stream delivery of the VOD or broadcasting service in conformance with the MPEG2 Transport Stream (MPEG2-TS), which can deliver a plurality of programs in one stream (or data sequence), is becoming more popular due to the increase in the number of users of the Internet, the more popular use of optical lines, and the increase in the communication speeds of communication networks.

The delivery in accordance with the MPEG2-TS sends the stream based on a Program Clock Reference (PCR), that is, time reference information to be referred to when performing a synchronized reproduction. On the other hand, at a client, the video and/or audio encoded data sequence is decoded and output as a reproduced output based on time management information (PTS: Presentation Time Stamp) of the reproduced output and time management information (DTS: Decoding Time Stamp) for decoding the data sequence.

The VOD delivery includes a pay-delivery which is a video content purchasing and accounting type, and a free-delivery which is an advertising type. In the case of a free-delivery model of the advertising type, the stream delivery of the advertising content may be made according to a client-led delivery system or a server-led delivery system. The client-led delivery system acquires a desired play list to be viewed when making a first connection at the client end, and successively requests delivery of a main part of the video content and the advertising content according to the play list at the client end, in order to make the delivery according to the requests.

FIG. 1 illustrates an example of an operation of the client-led delivery system. According to this delivery system, a client 20 first requests a play list with respect to a VOD server 10, and acquires from the VOD server 10 a play list 21 of an advertisement A and a main part (sequence 6-1). In the following description, a "client terminal" will be referred to as a "client", a "main part of the video content" will be referred to as a "main part", and an "advertising content" will be referred to as an "advertisement".

The client 20 requests viewing of the advertisement A to the VOD server 10 according to the play list 21, and the VOD server 10 delivers a stream of the advertisement A to the client 20 according to the viewing request (sequence 6-2). After the delivery of the advertisement A ends, the client 20 requests viewing of the main part, and the VOD server delivers a stream of the main part to the client 20 according to the viewing request (sequence 6-3).

FIG. 2 schematically illustrates an example of the client-led delivery system. If it is assumed for the sake of convenience that the play list 21 of the advertisement A and the main part has been acquired at the client 20, the client 20 sends to the VOD server 10 the request to view the advertisement A according to the play list 21. At the VOD server 10, when a receiving part 11 receives the request to view the advertisement A, the VOD server 10 sends the stream of the advertisement A to a delivering part 12, and the delivering part 12 delivers the stream of the advertisement A to the client 20.

At the client 20, after delivering the advertisement A, the request to view the main part is sent to the VOD server 10. When the receiving part 11 of the VOD server 10 receives the request to view the main part, the VOD server 10 sends the stream of the main part to the delivering part 12 according to the request to view the main part, and the delivering part 12 delivers the stream of the main part to the client 20.

In the client-led delivery system, the advertising content is delivered at a header portion or a trailer portion of the main part content in most cases. On the other hand, in the server-led delivery system, the server initially creates a stream in which the advertisements are inserted at intermediate portions of the main part, and delivers the stream of the main part created in advance and inserted with the advertisements in respect to a delivery request.

FIG. 3 schematically illustrates the state of delivery of the server-led delivery system. First, a preparation is made in advance at the VOD server 10 to create in advance the stream in which the advertisements are inserted at intermediate portions of the main part. For example, a first main part stream (to be delivered) is created in advance by inserting advertisements A and B into the main part and subjecting the main part to encoding and multiplexing. This first main part stream is stored in a storage unit such as a hard disk drive.

For example, as illustrated in FIG. 3, a main part stream (a) added with time information 1 through 10 is inserted with a stream (b) of the advertisement A added with the time information 1 through 3 and a stream (c) of the advertisement B added with the time information 1 through 3, and subjected to encoding and multiplexing to thereby create in advance, as one content, a first main part stream (d) (to be delivered).

FIG. 3 illustrates a case where the advertisement A is inserted into the main part before the time information 5, and the advertisement B is inserted into the main part before the time information 9. In this case, the time information 1 through 3 of the advertisement A is changed to time information 5 through 7 in the first main part stream (d) (to be delivered), and the time information 5 through 8 of the main part is changed to time information 8 through 11 in the first main part stream (d) (to be delivered).

In addition, the time information 1 through 3 of the advertisement B is changed to time information 12 through 14 in the first main part stream (d) (to be delivered), and the time information 9 and 10 of the main part is changed to time information 15 and 16 in the first main part stream (d) (to be delivered).

Hence, when the client 20 sends a request to view the first main part (to be delivered) as illustrated in FIG. 4, the VOD server 10 delivers to the client 20 the first main part stream (d) (to be delivered), which is created and stored in advanced and is inserted with the advertisements A and B.

According to the conventional server-led delivery system, when switching the advertisements, it is necessary to again make the preparation in advance. For example when the advertisements A and B are to be switched to advertisements C and D, a second main part stream (h) (to be delivered) and illustrated in FIG. 3 is created.

In other words, a main part stream (e) added with time information 1 through 10 is inserted with a stream (f) of the advertisement C added with the time information 1 through 3 and a stream (g) of the advertisement D added with the time information 1 through 3, and subjected to encoding and multiplexing to thereby create in advance, as one content, the second main part stream (h) (to be delivered).

In this case, even if a main part stream (e) is identical to the main part stream (a), the second main part stream (h) (to be delivered) must be created as a separate content, similarly to the first main part stream (d) (to be delivered).

For example, a Japanese Laid-Open Patent Publication No. 2005-160032 proposes a system that delivers digital contents such as video and music from a VOD server and reproduces the digital contents in a terminal equipment of the viewer.

When delivering the advertisements, the conventional client-led delivery system acquires the play list at the client when making the first connection. The request to view the main part and the request to view the advertisement must be made separately according to the play list, and there is a problem in that a seamless switching cannot be made between the main part and the advertisement.

In addition, in the conventional server-led delivery system, the VOD server must create in advance the stream in which the advertisements are inserted into the main part, subjected to encoding and multiplexing, and stored in the storage unit such as the hard disk drive. For this reason, even if the same main part is to be delivered, a plurality of kinds of main part streams inserted with different advertisements must be created and stored in the storage unit such as the hard disk drive if the different advertisements are to be delivered to different clients. As a result, the storage capacity of the storage unit such as the hard disk drive is easily used up by the main part streams to be stored therein.

SUMMARY

One object according to one aspect of the present invention is to provide an advertisement inserting VOD delivery method and a VOD server which enable VOD delivery of main parts inserted with advertisements, by enabling a seamless switching between the main part and the advertisement, without easily using up a storage capacity of a storage unit, such as a hard disk drive, that stores the main parts and the advertisements.

According to one aspect of the present invention, there is provided an advertisement inserting VOD delivery method comprising delivering to a client terminal a stream of a video content of a main part by inserting a stream of an advertising content into the stream of the video content of the main part, based on advertisement inserting position information indicating an inserting position of the advertising content to be inserted into the video content of the main part; and replacing time information to be added to the stream of the video content of the main part and the stream of the advertising content to be delivered to the client terminal by continuous time information in accordance with an order of the streams to be delivered to the client terminal, said time information being one of program time reference value, time management information of reproduced output and time management information of decoding.

According to one aspect of the present invention, there is provide a VOD server comprising a content control part configured to deliver to a client terminal a stream of a video content of a main part by inserting a stream of an advertising content into the stream of the video content of the main part, based on advertisement inserting position information indicating an inserting position of the advertising content to be inserted into the video content of the main part; and a time information inserting part configured to replace time information to be added to the stream of the video content of the main part and the stream of the advertising content to be delivered to the client terminal by continuous time information in accordance with an order of the streams to be delivered to the client terminal, said time information being one of program time reference value, time management information of reproduced output and time management information of decoding.

BRIEF DESCRIPTION OF THE DRAWINGS

FIG. 5 is a diagram illustrating a disclosed stream delivery;

FIG. 6 is a diagram illustrating an example of an internal structure of a disclosed VOD server;

FIG. 7 is a diagram illustrating an example of advertisement delivery information;

FIG. 8 is a diagram illustrating an example of an operation of delivery control; and FIG. 9 is a diagram illustrating an example of an operation associated with adding time information in an order of the streams to be delivered.

DESCRIPTION OF EMBODIMENTS

Figure 1:
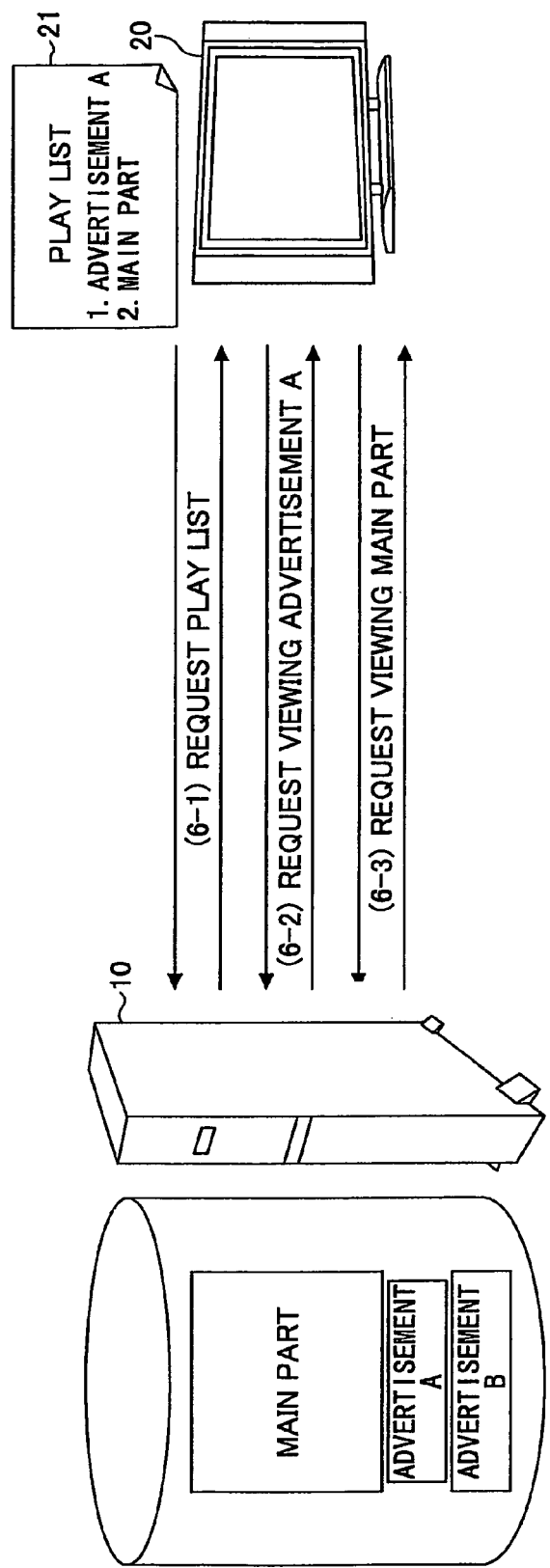
FIG. 1 is a diagram illustrating an example of an operation of the client-led delivery system.
Figure 2:
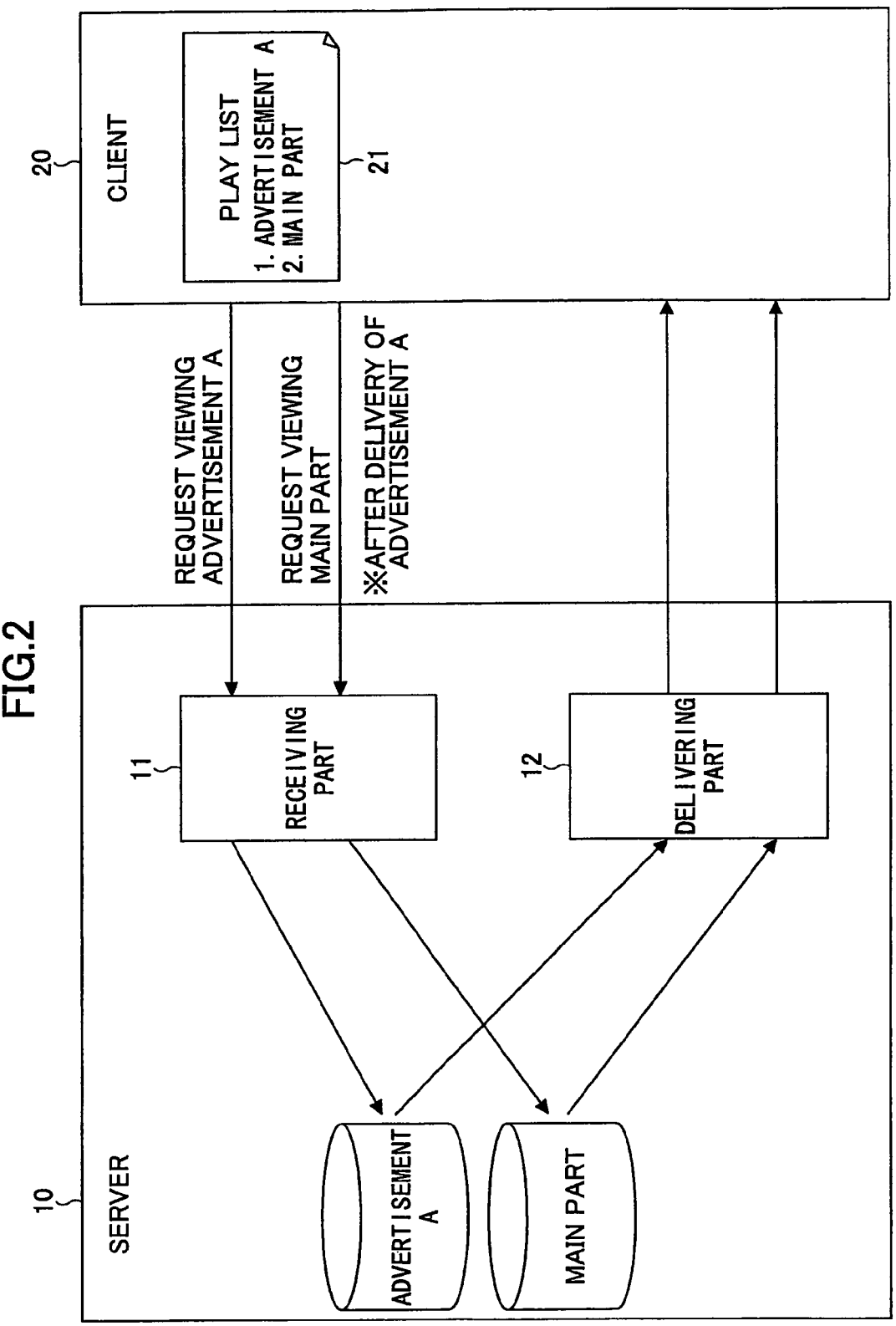
FIG. 2 is a diagram schematically illustrating an example of the client-led delivery system.
Figure 3:
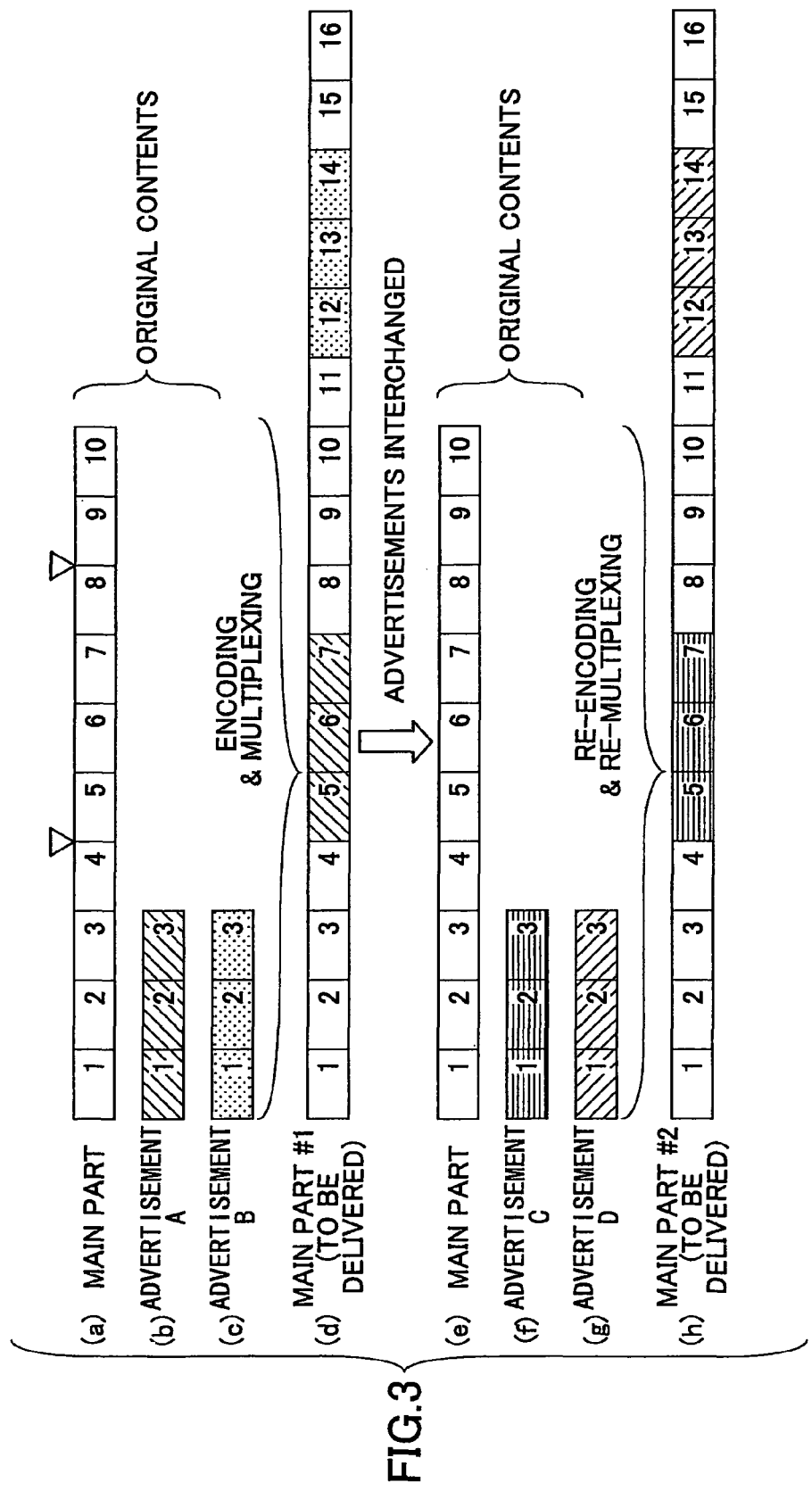
FIG. 3 is a diagram schematically illustrating the state of delivery of a conventional server-led delivery system.
Figure 4:
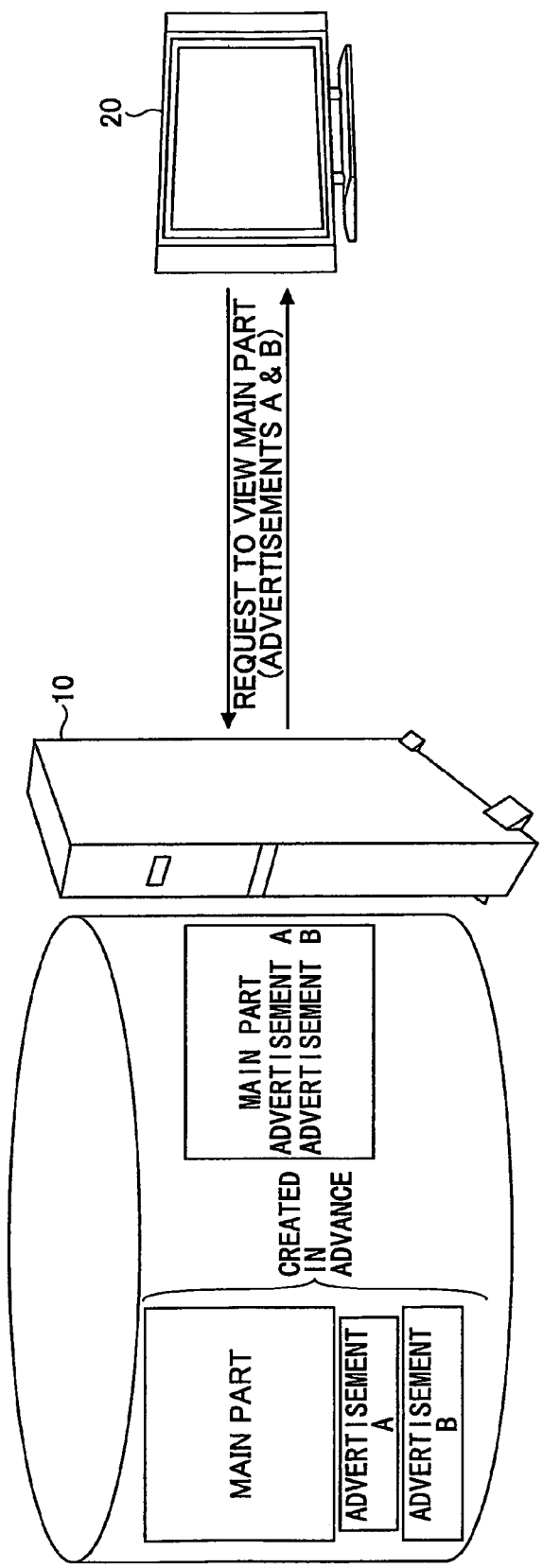
FIG. 4 is a diagram illustrating an example of an operation of the conventional server-led delivery system.

Preferred embodiments of the advertisement inserting VOD delivery method and the VOD server according to the present invention will be described with reference to FIG. 5 and the subsequent drawings.

FIG. 5 is a diagram illustrating a disclosed stream delivery. This stream delivery method controls, at a VOD server 10, deliveries of main parts and advertisements based on advertisement delivery information 13, in order to deliver a plurality of contents (main parts and advertisements) as if the contents were a stream of a single content, with respect to a client 20.

FIG. 6 is a diagram illustrating an example of an internal structure of the disclosed VOD server 10. In the VOD server 10, an advertisement delivery information analyzing part 14 reads the advertisement delivery information 13, and supplies main part information, advertisement information, and advertisement inserting information to a contents control part 15. In addition, the advertisement delivery information analyzing part 15 sends time information to a time information inserting part 16.

FIG. 7 is a diagram illustrating an example of the advertisement delivery information 13 in the form of a table. In the table illustrated in FIG. 7, No. 2 through No. 13 denote the main part information. No. 3 denotes a file name of the main part. No. 4 through No. 6 denote information related to the time information of a Program Clock Reference (PCR) of the main part, and information of each added position and value of the time information of the Program Clock Reference (PCR) in the main part stream is stored for the number of added positions and values of the time information added. For the sake of simplifying the description, FIG. 7 illustrates an example where the information of one added position and value of the time information in the main part stream is stored.

No. 7 through No. 9 denote information related to time information of a Presentation Time Stamp (PTS) of a reproduced output of the main part, and No. 10 through No. 12 denote information related to time information of a Decoding Time Stamp (DTS) for decoding the main part. Information of each added position and value of such time information in the main part is stored for the number of added positions and values of the time information added, similarly to the time information of the Program Clock Reference (PCR) in the main part stream described above. For the sake of simplifying the description, FIG. 7 illustrates an example where the information of one added position and value of such time information in the main part stream is stored. No. 13 denotes information of an I picture start position of the main part stream, and this information is stored for the number I pictures.

No. 14 through No. 26 denote advertisement information. The advertisement information is stored for the number of advertisements, however, for the sake of simplifying the description, FIG. 7 illustrates an example where the advertisement information of one advertisement is stored. No. 15 denotes a file name of the advertisement. No. 16 through No. 18 denote information related to the time information of the Program Clock Reference (PCR) of the advertisement, No. 19 through No. 21 denote information related to the time information of the Presentation Time Stamp (PTS) of the reproduced output of the advertisement, and No. 22 through No. 24 denote information related to the time information of the Decoding Time Stamp (DTS) for decoding the advertisement.

Information of each added position and value of the time information of the Program Clock Reference (PCR) of the advertisement, the time information of the Presentation Time Stamp (PTS) of the reproduced output of the advertisement, and the time information of the Decoding Time Stamp (DTS) for decoding the advertisement in the advertisement stream is respectively stored for the number of added positions and values of the time information added. For the sake of simplifying the description, FIG. 7 illustrates an example where the information of one added position and value of such time information in the advertisement stream is stored. No. 25 denotes information of an I picture start position of the advertisement stream, and this information is stored for the number I pictures.

No. 26 denotes advertisement inserting information, that is, information of advertisement inserting positions in the main part stream, and this information is stored for the number of advertisements. For the sake of simplifying the description, FIG. 7 illustrates an example where the advertisement inserting information of one advertisement in the main part stream is stored. The advertisement inserting information stores information No. 27 of time positions (inserting position) of the advertisements that are inserted in the main part stream, and information No. 28 indicating whether the advertisements are to be skipped in order not to be viewed by the viewer or user.

No. 29 through No. 38 denote time information after insertion of the advertisements, including a program time reference value (PCR: Program Clock Reference) of the stream to be delivered for the case where the main part is to be delivered by inserting the advertisements therein, the time information of time management information (PTS: Presentation Time Stamp) of the reproduced output, and the time information of time management information (DTS: Decoding Time Stamp) for decoding the advertisement. For the sake of simplifying the description, FIG. 7 illustrates an example where the information of one added position and value of such time information in the main part stream is stored.

The time information No. 29 through No. 38 after insertion of the advertisements is preferably created and stored prior to the delivery. This time information may be dynamically created in the VOD server 10 when the request to view the advertisements is received from the viewer. However, by creating this time information in advance, it becomes possible to reduce the processing load of the VOD server 10.

Returning now to the description of FIG. 6, the content control part 15 controls the delivery of the contents based on the main part information, the advertisement information and the advertisement inserting information of the advertisement delivery information 13. A description will now be given of an example of an operation of this delivery control, by referring to FIG. 8. In this example of the operation, it is assumed for the sake of convenience that the advertisement A illustrated in (b) is inserted before the time information 5 of the main part illustrated in (a), and the advertisement B illustrated in (c) is inserted before the time information 9 of the main part illustrated in (a).

The content control part 15 controls the insertion of the advertisements into the main part based on the advertisement inserting information, and after the delivery the main part stream up to the time information 4 ends, switches the delivery to the delivery of the advertisement stream of the advertisement A. In addition, after the delivery of the advertisement stream of the advertisement A ends, the content control part 15 switches the delivery to the delivery of the main part. After the delivery of the main part from the time information 5 to the time information 8 ends, the content control part 15 switches the delivery to the delivery of the advertisement stream of the advertisement B. After the delivery of the advertisement stream of the advertisement B ends, the content control part 15 switches the delivery to the delivery of the main part from the time information 9 to the time information 10. Accordingly, the main part and the advertisements are delivered in the stream illustrated in (d) of FIG. 8. However, at the client 20, the streams cannot be reproduced correctly unless the time information of the streams has values in accordance with the order of the streams as illustrated in (e) of FIG. 8.

The time information inserting part 16 illustrated in FIG. 6 replaces the time information (information after insertion of the advertisements) of the advertisement delivery information No. 29 through No. 38 indicated in the table of FIG. 7 by the time information (PCR, PTS and DTS) of each content of the main part and the advertisement in order to change the time information into continuous time information that keeps the order of the streams to be delivered. By changing the time information, the stream added with the time information in the ascending order is delivered to the client 20 as a single content. In the example illustrated in FIG. 9, the time information PCR, PTS and DTS are the same, and thus, the time information of the stream to be delivered is displayed as one kind of time information.

In order to enable reproduction of the moving picture that is delivered from an intermediate portion thereof, it is necessary to segment the content in units of GOP (Group Of Picture). In addition, when inserting the advertisement, the advertisement is inserted when the delivery of the content of the main part in the GOP unit ends (next reference picture start position). By doing so, the delivery of the main part when resumed automatically starts from the start (reference picture) of the content in the GOP unit, and a seamless reproduction becomes possible at the client.

Next, a description will be given of the sequence of the disclosed stream delivery. First, a preparation is made in advance to prepare the advertisement delivery information 13. Then, the time information for the case where the advertisement is inserted into the main part is computed and stored according to the main part information, the advertisement information and the advertisement inserting information of the advertisement delivery information 13.

Thereafter, a request to view the main part is made from the client 20 to the VOD server 10, and when the VOD server 10 receives this request to view the main part, the VOD server 10 analyzes the advertisement delivery information 13 and starts delivery of the main part. The content control part 15 monitors the lapse of time of the delivery, and reads the advertisement stream at a timing slightly before an advertisement inserting time for inserting the advertisement is reached, in order to prepare for the delivery of the advertisement. When the advertisement inserting time is reached, the delivery is switched from the delivery of the main part to the delivery of the advertisement. A breakpoint of the switching between the main part and the advertisement is determined by a reference frame (I picture).

The time information inserting part 16 replaces the time information after the insertion of the advertisement, that has been computed and stored in advance by the preparation described above, by the time information (PCR, PTS and DTS) of each content, and delivers the stream after this replacement from the delivering part 12. Because the main part and the advertisement are separate contents, each content has its own time information. For this reason, if the time information of the main part and the time information of the advertisement were delivered as they are, the time information would become discontinuous and the stream that is delivered would not be reproduced correctly at the client 20. However, by changing in the time information inserting part 16 the time information into the continuous time information that keeps the order of the streams to be delivered, the main part and the advertisement are delivered as if the content of the main part and the content of the advertisement were a stream of a single content which can be reproduced correctly at the client 20. When the delivery of the advertisement ends, the delivery is resumed from the intermediate portion of the main part (position where the advertisement was inserted).

By delivering the stream of the main part inserted with the advertisement to the client 20, the stream appears to the client 20 as if the stream relates to a single video content. For this reason, it is possible to deliver the main part inserted with the advertisement, without depending on the control performed in the client 20. In addition, the main part inserted with the advertisement can be viewed at the existing client 20, without having to modify the client 20.

Moreover, it is possible to interchange the advertisements by simply changing the advertisement inserting information.

Hence, the advertisements can be interchanged with ease, and the advertisement inserting position can be determined in a VOD deliverer-led manner.

Furthermore, each of the data related to the video content of the main part and the data related to the advertising content of each advertisement needs to be stored only once in the storage unit such as the hard disk drive, even with respect to different combinations of the main part and the advertisements. It is sufficient to store the advertisement delivery information for each of the combinations of the main part and the advertisements, and the same data of the main part and the advertisements need not be stored for the different combinations. Consequently, it is possible to considerably reduce the required storage capacity of the storage unit such as the hard disk drive when compared to the conventional method.

According to the disclosed advertisement inserting VOD delivery method and the disclosed VOD server, it is possible to perform a seamless switching between the main part and the advertisement, and the VOD delivery of the main part inserted with the advertisements can be made without using up the storage capacity of the storage unit, such as the hard disk drive, that stores the main parts and the advertisements.

Although the embodiments of the present invention have been described in detail, it should be understood that the various changes, substitutions, and alterations could be made hereto without departing from the spirit and scope of the invention.

What is claimed is:

1. An advertisement inserting VOD delivery method comprising:
   inserting a stream of an advertising content of an advertisement into a stream of a video content of a main part to be delivered to a client terminal, based on advertisement inserting position information indicating an inserting position of the advertising content to be inserted into the video content of the main part;
   replacing first time information to be added to the stream of the video content of the main part and second time information to be added to the stream of the advertising content to be delivered to the client terminal; and
   delivering, to the client terminal the stream of the video content of the main part and the stream of the advertising content that are added with the continuous time information, and
   wherein the first time information to be added to the stream of the video content of the main part includes a program time reference value of the main part, time management information of a reproduced output of the main part, and time management information of decoding of the main part, and
   wherein the second time information to be added to the stream of the advertising content of the advertisement includes a program time reference value of the advertisement, the time management information of a reproduced output of the advertisement, and the time management information of decoding of the advertisement.

2. The advertisement inserting VOD delivery method as claimed in claim 1,
   wherein the continuous time information is computed and stored in advance in the order of the streams to be delivered to the client terminal, based on the advertisement inserting position information and the first time information added to each stream of the video content of each main part and the second time information added to each stream of the advertising content of each advertisement, for each combination of the video content of each main part and the advertising content of each advertisement.

3. The advertisement inserting VOD delivery method as claimed in claim 1, wherein the advertisement is interchanged with another advertisement by changing the advertisement inserting information.

4. A VOD server comprising:
- a content control unit configured to insert a stream of an advertising content of an advertisement into a stream of a video content of a main part to be delivered to a client terminal, based on advertisement inserting position information indicating an inserting position of the advertising content to be inserted into the video content of the main part;
- a time information inserting unit configured to replace first time information to be added to the stream of the video content of the main part and second time information to be added to the stream of the advertising content to be delivered to the client terminal by continuous time information in accordance with an order of the streams to be delivered to the client terminal; and
- a delivering unit configured to deliver, to the client terminal, the stream of the video content of the main part and the stream of the advertising content that are added with the continuous time information,
- wherein the first time information to be added to the stream of the video content of the main part includes a program time reference value of the main part, time management information of a reproduced output of the main part, and time management information of decoding of the main part, and
- wherein the second time information to be added to the stream of the advertising content of the advertisement includes a program time reference value of the advertisement, the time management information of a reproduced output of the advertisement, and the time management information of decoding of the advertisement.

5. The VOD server as claimed in claim 4,
wherein the continuous time information is computed and stored in advance in the order of the streams to be delivered to the client terminal, based on the advertisement inserting position information and the first time information added to each stream of the video content of each main part and the second time information added to each stream of the advertising content of each advertisement, for each combination of the video content of each main part and the advertising content of each advertisement.

6. The VOD server as claimed in claim 4, wherein the advertisement is interchanged with another advertisement by changing the advertisement inserting information.

* * * * *

UNITED STATES PATENT AND TRADEMARK OFFICE
CERTIFICATE OF CORRECTION

PATENT NO. : 8,402,485 B2  
APPLICATION NO. : 12/588698  
DATED : March 19, 2013  
INVENTOR(S) : Hidenori Takai et al.

Page 1 of 1

It is certified that error appears in the above-identified patent and that said Letters Patent is hereby corrected as shown below:

In the Claims:

Column 8, Line 40, In Claim 1, delete "terminal;" and insert -- terminal by continuous time information in accordance with an order of the streams to be delivered to the client terminal; --

Signed and Sealed this  
Seventeenth Day of September, 2013

Teresa Stanek Rea  
*Deputy Director of the United States Patent and Trademark Office*